US008886250B2

(12) United States Patent
Barbieri et al.

(10) Patent No.: US 8,886,250 B2
(45) Date of Patent: Nov. 11, 2014

(54) CHANNEL QUALITY REPORTING FOR DIFFERENT TYPES OF SUBFRAMES

(75) Inventors: Alan Barbieri, San Diego, CA (US); Madhavan Srinivasan Vajapeyam, San Diego, CA (US); Tingfang Ji, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 193 days.

(21) Appl. No.: 13/163,595

(22) Filed: Jun. 17, 2011

(65) Prior Publication Data

US 2011/0312358 A1 Dec. 22, 2011

Related U.S. Application Data

(60) Provisional application No. 61/356,346, filed on Jun. 18, 2010.

(51) Int. Cl.
*H04B 7/00* (2006.01)
*H04W 24/10* (2009.01)
*H04W 24/06* (2009.01)
*H04W 72/08* (2009.01)

(52) U.S. Cl.
CPC .............. *H04W 24/10* (2013.01); *H04W 24/06* (2013.01); *H04W 72/082* (2013.01)
USPC ........ 455/524; 455/525; 455/552.1; 455/438; 370/252

(58) Field of Classification Search
CPC ... H04W 24/10; H04W 72/085; H04W 24/06; H04W 72/082
USPC ........ 455/552.1, 436–442, 452.2, 135, 161.3, 455/277.2, 524, 525; 370/331–334, 252
See application file for complete search history.

(56) References Cited

U.S. PATENT DOCUMENTS

| 5,936,979 | A | * | 8/1999 | Jyrkka | ........................... 714/763 |
| 6,574,456 | B2 | | 6/2003 | Hamabe | |
| 6,839,333 | B1 | * | 1/2005 | Åkerberg | ....................... 370/330 |
| 6,907,270 | B1 | | 6/2005 | Blanz | |
| 6,973,098 | B1 | | 12/2005 | Lundby et al. | |

(Continued)

FOREIGN PATENT DOCUMENTS

| CN | 1438781 A | 8/2003 |
| CN | 1943158 A | 4/2007 |

(Continued)

OTHER PUBLICATIONS

Duplicy, J. et al. (Mar. 8, 2011) "MU-MIMO in LTE Systems," EURASIP Journal on Wireless Communications and Networking, Hindawi Publishing Corporation, vol. 2011, Article ID 496763, pp. 1-13, doi: 10.1155/2011/496763.

(Continued)

*Primary Examiner* — Dominic E Rego
(74) *Attorney, Agent, or Firm* — Seyfarth Shaw LLP

(57) ABSTRACT

A method for determining channel quality estimates of two or more types of subframes, such as clean and unclean subframes, may be applicable to both legacy and newer user equipment. A first base station affects a channel quality measurement by either transmitting dummy signals over designed tones that correspond to a second base station, or by puncturing transmissions during designated tones that correspond to the second base station.

28 Claims, 10 Drawing Sheets

(56) References Cited

U.S. PATENT DOCUMENTS

| | | | |
|---|---|---|---|
| 7,031,753 B2* | 4/2006 | Hashem et al. | 455/561 |
| 7,283,510 B2 | 10/2007 | Ito et al. | |
| 7,738,907 B2 | 6/2010 | Xiao et al. | |
| 7,813,311 B2 | 10/2010 | Dick et al. | |
| 7,860,198 B2 | 12/2010 | Montalbano | |
| 7,907,572 B2 | 3/2011 | Yang et al. | |
| 7,944,983 B2 | 5/2011 | Fu et al. | |
| 8,068,785 B2 | 11/2011 | Ahn et al. | |
| 8,073,481 B2 | 12/2011 | Luo et al. | |
| 8,085,875 B2 | 12/2011 | Gore et al. | |
| 8,107,885 B2 | 1/2012 | Love et al. | |
| 8,121,602 B2 | 2/2012 | Yi et al. | |
| 8,130,849 B2 | 3/2012 | Lincoln et al. | |
| 8,254,911 B1 | 8/2012 | Lee | |
| 8,270,547 B2 | 9/2012 | Panicker et al. | |
| 8,275,408 B2 | 9/2012 | Attar et al. | |
| 8,305,921 B2 | 11/2012 | Narasimhan et al. | |
| 8,385,477 B2 | 2/2013 | Cedergren et al. | |
| 8,477,603 B2 | 7/2013 | Sambhwani et al. | |
| 8,493,942 B2 | 7/2013 | Luo et al. | |
| 8,605,771 B2 | 12/2013 | Cairns | |
| 8,611,295 B2 | 12/2013 | Song et al. | |
| 8,654,701 B2 | 2/2014 | Kazmi et al. | |
| 2001/0007819 A1* | 7/2001 | Kubota | 455/439 |
| 2002/0188723 A1* | 12/2002 | Choi et al. | 709/225 |
| 2003/0016740 A1 | 1/2003 | Jeske et al. | |
| 2003/0125040 A1 | 7/2003 | Walton et al. | |
| 2004/0072579 A1 | 4/2004 | Hottinen | |
| 2006/0121946 A1 | 6/2006 | Walton et al. | |
| 2007/0036179 A1 | 2/2007 | Palanki et al. | |
| 2007/0064655 A1 | 3/2007 | Ruuska | |
| 2007/0081480 A1 | 4/2007 | Cai et al. | |
| 2007/0109989 A1 | 5/2007 | Nakagawa et al. | |
| 2007/0197251 A1 | 8/2007 | Das et al. | |
| 2008/0014958 A1* | 1/2008 | Kim et al. | 455/452.2 |
| 2008/0123547 A1 | 5/2008 | Palanki | |
| 2008/0233967 A1 | 9/2008 | Montojo et al. | |
| 2009/0135754 A1 | 5/2009 | Yavuz et al. | |
| 2009/0161781 A1 | 6/2009 | Kolze | |
| 2009/0170442 A1 | 7/2009 | Asanuma et al. | |
| 2009/0199055 A1 | 8/2009 | Chen et al. | |
| 2009/0201825 A1 | 8/2009 | Shen et al. | |
| 2009/0238256 A1 | 9/2009 | Onggosanusi et al. | |
| 2009/0247181 A1 | 10/2009 | Palanki et al. | |
| 2009/0252077 A1 | 10/2009 | Khandekar et al. | |
| 2009/0257390 A1 | 10/2009 | Ji et al. | |
| 2009/0286497 A1 | 11/2009 | Akkarakaran et al. | |
| 2009/0316809 A1 | 12/2009 | Chun et al. | |
| 2009/0323616 A1* | 12/2009 | Zeller et al. | 370/329 |
| 2010/0002664 A1 | 1/2010 | Pan et al. | |
| 2010/0008282 A1 | 1/2010 | Bhattad et al. | |
| 2010/0035555 A1 | 2/2010 | Bala et al. | |
| 2010/0039970 A1* | 2/2010 | Papasakellariou et al. | 370/310 |
| 2010/0041390 A1 | 2/2010 | Chen et al. | |
| 2010/0048151 A1 | 2/2010 | Hara | |
| 2010/0067366 A1 | 3/2010 | Nicoli et al. | |
| 2010/0098012 A1 | 4/2010 | Bala et al. | |
| 2010/0106828 A1 | 4/2010 | Palanki et al. | |
| 2010/0111235 A1 | 5/2010 | Zeng et al. | |
| 2010/0182903 A1 | 7/2010 | Palanki et al. | |
| 2010/0195604 A1 | 8/2010 | Papasakellariou et al. | |
| 2010/0202311 A1 | 8/2010 | Lunttila et al. | |
| 2010/0202372 A1 | 8/2010 | Chun et al. | |
| 2010/0214937 A1 | 8/2010 | Chen et al. | |
| 2010/0215075 A1 | 8/2010 | Jonsson et al. | |
| 2010/0216405 A1 | 8/2010 | Bhadra et al. | |
| 2010/0222062 A1 | 9/2010 | Chou et al. | |
| 2010/0226327 A1 | 9/2010 | Zhang et al. | |
| 2010/0227638 A1* | 9/2010 | Park et al. | 455/522 |
| 2010/0272077 A1* | 10/2010 | Van Rensburg et al. | 370/336 |
| 2010/0278109 A1 | 11/2010 | Papasakellariou et al. | |
| 2010/0278290 A1 | 11/2010 | Huang et al. | |
| 2011/0013710 A1 | 1/2011 | Xiao | |
| 2011/0032839 A1 | 2/2011 | Chen et al. | |
| 2011/0081917 A1 | 4/2011 | Frank et al. | |
| 2011/0092231 A1 | 4/2011 | Yoo et al. | |
| 2011/0105171 A1 | 5/2011 | Luschi et al. | |
| 2011/0142003 A1 | 6/2011 | Kuchi et al. | |
| 2011/0158211 A1 | 6/2011 | Gaal et al. | |
| 2011/0170514 A1 | 7/2011 | Eriksson et al. | |
| 2011/0177821 A1 | 7/2011 | Senarath et al. | |
| 2011/0206167 A1 | 8/2011 | Rosenqvist et al. | |
| 2011/0249643 A1 | 10/2011 | Barbieri et al. | |
| 2011/0250919 A1* | 10/2011 | Barbieri et al. | 455/509 |
| 2011/0275394 A1 | 11/2011 | Song et al. | |
| 2011/0312319 A1 | 12/2011 | Lindoff et al. | |
| 2011/0317624 A1 | 12/2011 | Luo et al. | |
| 2012/0003945 A1 | 1/2012 | Liu et al. | |
| 2012/0009959 A1 | 1/2012 | Yamada et al. | |
| 2012/0044818 A1 | 2/2012 | Lindoff et al. | |
| 2012/0076025 A1 | 3/2012 | Barbieri et al. | |
| 2012/0076040 A1 | 3/2012 | Hoshino et al. | |
| 2012/0082197 A1 | 4/2012 | Jonsson et al. | |
| 2012/0092989 A1 | 4/2012 | Baldemair et al. | |
| 2012/0113851 A1 | 5/2012 | Schober et al. | |
| 2012/0190391 A1 | 7/2012 | Yoo et al. | |
| 2012/0201152 A1 | 8/2012 | Yoo et al. | |
| 2012/0263247 A1 | 10/2012 | Bhattad et al. | |
| 2012/0327795 A1 | 12/2012 | Mallik et al. | |
| 2012/0329498 A1 | 12/2012 | Koo et al. | |
| 2013/0039203 A1 | 2/2013 | Fong et al. | |
| 2013/0157675 A1 | 6/2013 | Li et al. | |
| 2013/0301458 A1 | 11/2013 | Barbieri et al. | |

FOREIGN PATENT DOCUMENTS

| | | |
|---|---|---|
| EP | 1337054 A2 | 8/2003 |
| EP | 1735938 A1 | 12/2006 |
| JP | 2007189619 A | 7/2007 |
| JP | 3973017 B2 | 9/2007 |
| JP | 2010016494 A | 1/2010 |
| JP | 2013534778 A | 9/2013 |
| KR | 20080046404 A | 5/2008 |
| WO | 03041300 A1 | 5/2003 |
| WO | 2005089004 A1 | 9/2005 |
| WO | 2005099163 A1 | 10/2005 |
| WO | 2006020021 A1 | 2/2006 |
| WO | 2007016553 A1 | 2/2007 |
| WO | WO2008082118 A1 | 7/2008 |
| WO | 2008118810 A1 | 10/2008 |
| WO | 2009057960 A2 | 5/2009 |
| WO | 2009065075 A1 | 5/2009 |
| WO | 2009099811 A1 | 8/2009 |
| WO | 2009119988 A1 | 10/2009 |
| WO | 2009120934 A1 | 10/2009 |
| WO | WO2009118707 A1 | 10/2009 |
| WO | WO2010002230 A2 | 1/2010 |
| WO | 2010025270 A1 | 3/2010 |
| WO | 2010056763 A2 | 5/2010 |
| WO | 2010058979 A2 | 5/2010 |
| WO | 2010083451 A2 | 7/2010 |
| WO | WO2010074444 A2 | 7/2010 |
| WO | WO2010089408 A1 | 8/2010 |
| WO | 2010103886 A1 | 9/2010 |
| WO | WO2011002389 A1 | 1/2011 |
| WO | 2011130447 A1 | 10/2011 |
| WO | 2011163265 A1 | 12/2011 |
| WO | 2011163482 A1 | 12/2011 |
| WO | WO2012018894 A1 | 2/2012 |

OTHER PUBLICATIONS

Hsieh M-H. et al: "Channel Estimation for OFDM Systems Based on Comb-Type Pilot Arrangement in Frequency Selective Fading Channels" IEEE Transactions on Consumer Electronics, vol. '44, No. 1, Feb. 1, 1998, pp. 217-225.

Huawei: "Correction on CQI reporting", 3GPP Draft; R1-091652 36.213 CR238(REL-8,F) Correction on CQI Reporting, 3rd Generation Partnership Project (3GPP), Mobile Competence Centre ; 650, Route Des Lucioles ; F-06921 Sophia-Antipolis Cedex ; France, No. Seoul, Korea; Mar. 28, 2009, XP050339187, [retrieved on Mar. 28, 2009].

(56) References Cited

OTHER PUBLICATIONS

Huawei: "CQI Enhancement for Interference Varying Environments", 3GPP Draft; R1-101061 CQI Enhancement for Interference Varying Environments Ver (Final), 3rd Generation Partnership Project (3GPP), Mobile Competence Centre ; 650, Route Des Lucioles ; F-06921 Sophia-Antipolis Cedex ; France, vol. RAN WGI, No. San Francisco, USA; Feb. 22, 2010, Feb. 16, 2010, XP050418632, [retrieved on Feb. 16, 2010].
Huawei: "Enhanced ICIC and Resource-Specific CQI Measurement", 3GPP Draft; R1-101981, 3rd Generation Partnership Project (3GPP), Mobile Competence Centre ; 650, Route Des Lucioles ; F-06921 Sophia-Antipolis Cedex ; France, vol. RAN WGI, No. Beijing, china; Apr. 12, 2010, Apr. 6, 2010, XP050419318, [retrieved on Apr. 6, 2010].
Partial International Search Report—PCT/US2011/041004, ISA/EPO—Oct. 4, 2011.
"3rd Generation Partnership Project; Technical Specification Group Radio Access Network; Evolved Universal Terrestrial Radio Access (E-UTRA) ; Physical layer procedures (Release 9)", 3GPP Standard; 3GPP TS 36.213, 3rd Generation Partnership Project (3GPP), Mobile Competence Centre ; 650, Route Des Lucioles ; F-06921 Sophia-Antipolis Cedex ; France, No. V9.3.0, Sep. 17, 2010, pp. 1-80, XP050442094, [retrieved on Sep. 17, 2010].
International Search Report and Written Opinion—PCT/US2011/053424—ISA/EPO—Feb. 29, 2012.
Philips: "CQI/PMI reference measurement periods", 3GPP Draft; R1-082528, 3rd Generation Partnership Project (3GPP), Mobile Competence Centre ; 650, Route Des Lucioles ; F-06921 Sophia-Antipolis Cedex ; France, vol. RAN WGI, No. Warsaw, Poland; Jun. 25, 2008, XP050110793, [retrieved on Jun. 25, 2008].
CATT: "Considerations on Interference Coordination in Het-Net", 3GPP Draft; R1-100902, 3rd Generation Partnership Project (3GPP), Mobile Competence Centre ; 650, Route Des Lucioles ; F-06921 Sophia-Antipolis Cedex ; France, vol. RAN WGI, No. San Francisco, USA; Feb. 22, 2010, Feb. 16, 2010, XP050418504, [retrieved on Feb. 16, 2010].
CMCC: "Discussion on HeNB related interference scenarios and deployment configurations" , 3GPP Draft; R4-091232, 3rd Generation Partnership Project (3GPP), Mobile Competence Centre ; 650, Route Des Lucioles ; F-06921 Sophia-Antipolis Cedex ; France, No. Seoul, Korea; Mar. 30, 2009, Mar. 30, 2009, XP050342009, [retrieved on Mar. 30, 2009] the whole document.
International Search Report and Written Opinion—PCT/US2011/0410046—ISA/EPO—Nov. 24, 2011.

NTT DoCoMo: "Interference Coordination for Non-CA-based Heterogeneous Networks", 3GPP Draft; R1-102307 ICIC for Non-CA HETNET, 3rd Generation Partnership Project (3GPP), Mobile Competence Centre ; 650, Route Des Lucioles ; F-06921 Sophia-Antipolis Cedex ; France, vol. RAN WG1, No. Beijing, china; Apr. 12, 2010, Apr. 7, 2010, XP050419698, [retrieved on Apr. 7, 2010].
Sawahashi M., et al., "Coordinated multi point transmission/reception techniques for LTE-advanced [Coordinated and Distributed MIMO]" IEEE Wireless Communications, IEEE Service Center, Piscataway, NJ, US, vol. 17, No. 3, Jun. 1, 2010, pp. 26-34, XP011311805, ISSN: 1536-1284 p. 30, paragraph Uplink.
Intel Corporation (UK) Ltd, "Non-CA based PDCCH Interference Mitigation in LTE-A", 3GPP TSG RAN WG1 Meeting #61 R1-102814 Montreal, Canada, May 10-14, 2010.
Qualcomm Incorporated, "Enabling communication in harsh interference scenarios", 3GPP TSG-RAN WG1 #62bis R1-105693 Oct. 11-Oct. 15, 2010 Xian, China.
Research in Motion et al: "On Downlink Single Cell MU-MIMO in LTE-A", 3GPP Draft; R1-094458(RIM-Downlink Single Cell MU-MIMO in LTE-A), 3rd Generation Partnership Project (3GPP), Mobile Competence Centre; 650, Route Des Lucioles; F-06921 Sophia-Antipolis Cedex; France, no. Jeju; Nov. 9, 2009, XP050388884, [retrieved on Nov. 3, 2009] p. 3.
Research in Motion, UK Limited, "On Downlink Single Cell MU-MIMO in LTE-A", 3GPP TSG RAN WG1 Meeting #59bis R1-100562, Valencia, Spain, Jan. 18-22, 2010.
Catt: "Analysis of Time-Partitioning Solution for Control Channel", 3GPP TSG RAN WG1 meeting #61bis, R1-103494, Dresden, Germany, Jun. 28-Jul. 2, 2010, pp. 1-3.
Huawei: "Enhanced ICIC and Resource-Specific CQI Measurement", 3GPP TSG RAN WG1 meeting #61bis, R1-103900, Dresden, Germany, Jun. 28-Jul. 2, 2010, pp. 1-6.
Khandekar A., "LTE-Advanced: Heterogeneous networks", Wireless Conference (EW), 2010 European, Apr. 12-15, 2010, pp. 978-982.
Nishio A, et al., "Adaptive Transmission Techniques for Control Signaling in 3G-LTE," Panasonic Technical Journal, vol. 55, No. 1, Apr. 2009, pp. 15-20.
Qualcomm Incorporated: "Data channel ICIC and the benefits of possible extensions", 3GPP Draft; R1-103562 Data Channel ICIC and the Benefits of Possible Extensions, 3rd Generation Partnership Project (3GPP), Mobile Competence Centre; 650, Route des Lucioles; F-06921 Sophia-Anti Polis Cedex; France, vol. RAN WG1, no. Dresden, Germany; Jun. 28-Jul. 2, 2010, XP050449060, pp. 1-5.

\* cited by examiner

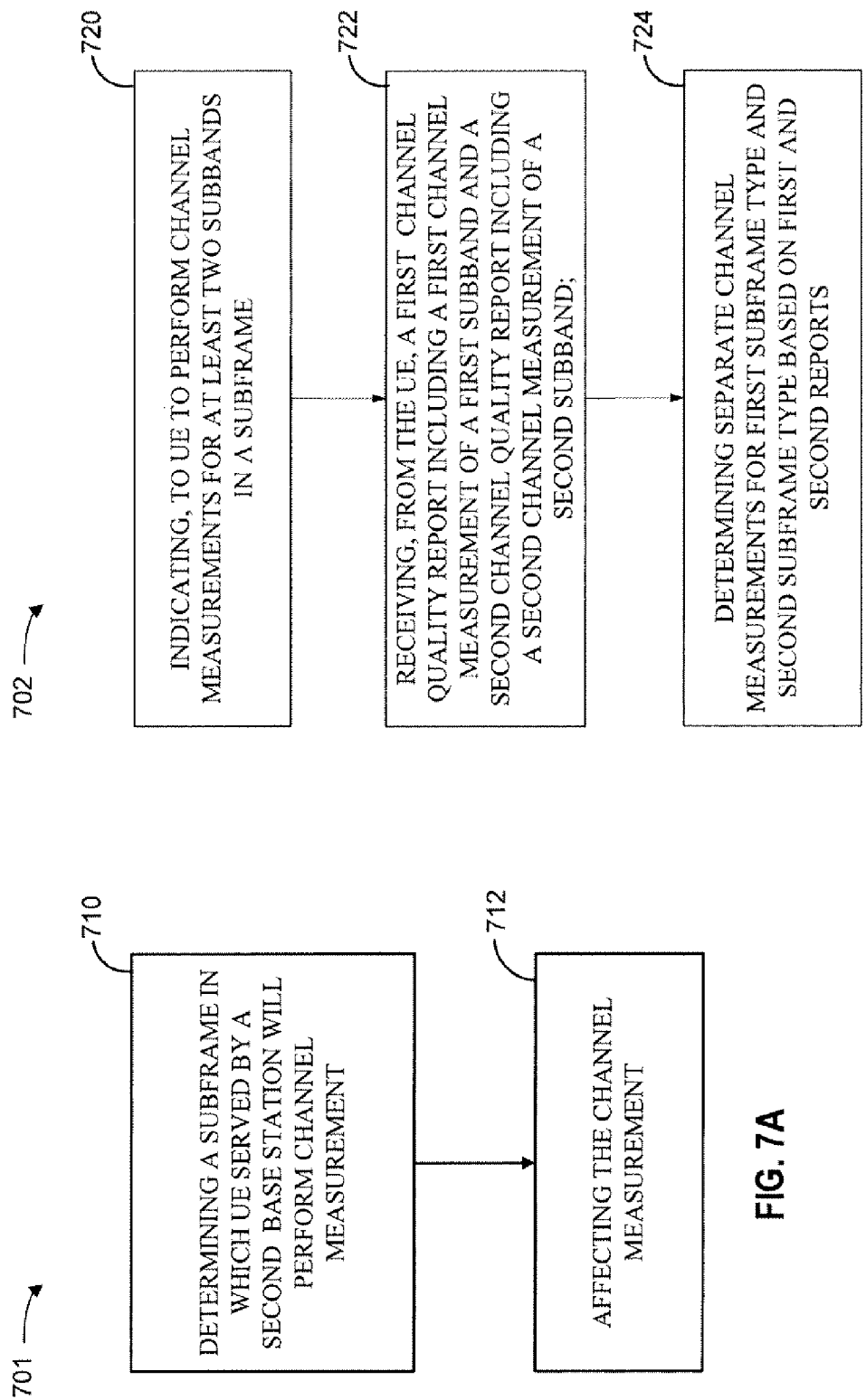

CHANNEL QUALITY REPORTING FOR DIFFERENT TYPES OF SUBFRAMES

CROSS-REFERENCE TO RELATED APPLICATION

This application claims the benefit under 35 U.S.C. §119 (e) to U.S. Provisional Patent Application No. 61/356,346 entitled "Channel Quality Reporting for Clean and Unclean Subframes," filed on Jun. 18, 2010, the disclosure of which is expressly incorporated by reference herein in its entirety.

BACKGROUND

1. Field

Aspects of the present disclosure relate generally to wireless communication systems, and more particularly to reporting channel quality in wireless communications systems.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

One aspect discloses reporting channel quality estimations of two or more types of subframes, such as clean and unclean subframes that is applicable to both legacy and newer user equipment. A first base station affects a channel quality measurement by either transmitting dummy signals over designed tones that correspond to a second base station, or by puncturing transmissions during designated tones that correspond to the second base station.

In one aspect, a method for channel quality estimation by a first base station in a wireless network, is disclosed. The method includes determining a subframe in which a user equipment (UE) served by a second base station will perform a channel quality measurement. The channel quality measurement is affected by either transmitting dummy signals over designated tones corresponding to the second base station on a first selected subband during the subframe or by puncturing transmissions during designated tones corresponding to the second base station over a second selected subband during the subframe.

Another aspect discloses a method for channel quality estimation in a wireless network and includes indicating, to a user equipment (UE), to perform a plurality of channel quality measurements for at least two subbands in a subframe. A first channel quality report including a first channel quality measurement of a first subband and a second channel quality report including a second channel quality measurement of a second subband are received from the UE. Separate channel quality measurements for a first subframe type and a second subframe type are determined based on the first and second reports.

Another aspect discloses an apparatus including means for determining a subframe in which a user equipment (UE) served by a second base station will perform a channel quality measurement. Also included is means for affecting the channel quality measurement where the means includes transmitting dummy signals over designated tones corresponding to the second base station on a first selected subband during the subframe or the means includes puncturing transmissions during designated tones corresponding to the second base station over a second selected subband during the subframe.

In another aspect, an apparatus for wireless communication is disclosed and includes means for indicating, to a user equipment (UE), to perform a plurality of channel quality measurements for at least two subbands in a subframe. Also included is a means for receiving a first channel quality report and a second channel quality report from the UE. The first channel quality report includes a first channel quality measurement of a first subband and the second channel quality report includes a second channel quality measurement of a second subband. Also included is a means for determining separate channel quality measurements for a first subframe type and a second subframe type based on the first and second reports.

A computer program product for wireless communications in a wireless network is also disclosed. The computer readable medium has program code recorded thereon which, when executed by the processor(s), causes the processor(s) to perform operations of determining a subframe in which a user equipment (UE) served by a second base station will perform a channel quality measurement. The program code also causes the processor(s) to affect the channel quality measurement. The channel quality measurement may be affected by transmitting dummy signals over designated tones corresponding to the second base station on a first selected subband during the subframe, or by puncturing transmissions during designated tones corresponding to the second base station over a second selected subband during the subframe.

A computer program product for wireless communications in a wireless network is also disclosed. The computer readable medium has program code recorded thereon which, when executed by the processor(s), causes the processor(s) to perform operations of indicating, to a user equipment (UE), to perform a plurality of channel quality measurements for at least two subbands in a subframe. The program code also causes the processor(s) to receive a first channel quality report and a second channel quality report from the UE. The first channel quality report includes a first channel quality measurement of a first subband and the second channel quality report includes a second channel quality measurement of a second subband. The program code also causes the processor(s) to determine separate channel quality measurements for a first subframe type and a second subframe type based on the first and second reports.

Another aspect discloses wireless communication having a memory and at least one processor coupled to the memory. The processor(s) is configured to determine a subframe in which a user equipment (UE) served by a second base station will perform a channel quality measurement. The processor(s) is also configured to affect the channel quality measurement by transmitting dummy signals over designated tones corresponding to the second base station on a first selected subband during the subframe, or by puncturing transmissions during designated tones corresponding to the second base station over a second selected subband during the subframe.

In another aspect, wireless communication having a memory and at least one processor coupled to the memory is disclosed. The processor(s) is configured to indicate, to a user equipment (UE), to perform a plurality of channel quality measurements for at least two subbands in a subframe. Additionally, the processor(s) is configured to receive, from the UE, a first channel quality report including a first channel quality measurement of a first subband and a second channel quality report including a second channel quality measurement of a second subband. Further, the processor(s) is configured to determine separate channel quality measurements for a first subframe type and a second subframe type based on the first and second reports.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 7A-7C are block diagrams illustrating channel quality index reporting for different types of subframes.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (ETA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
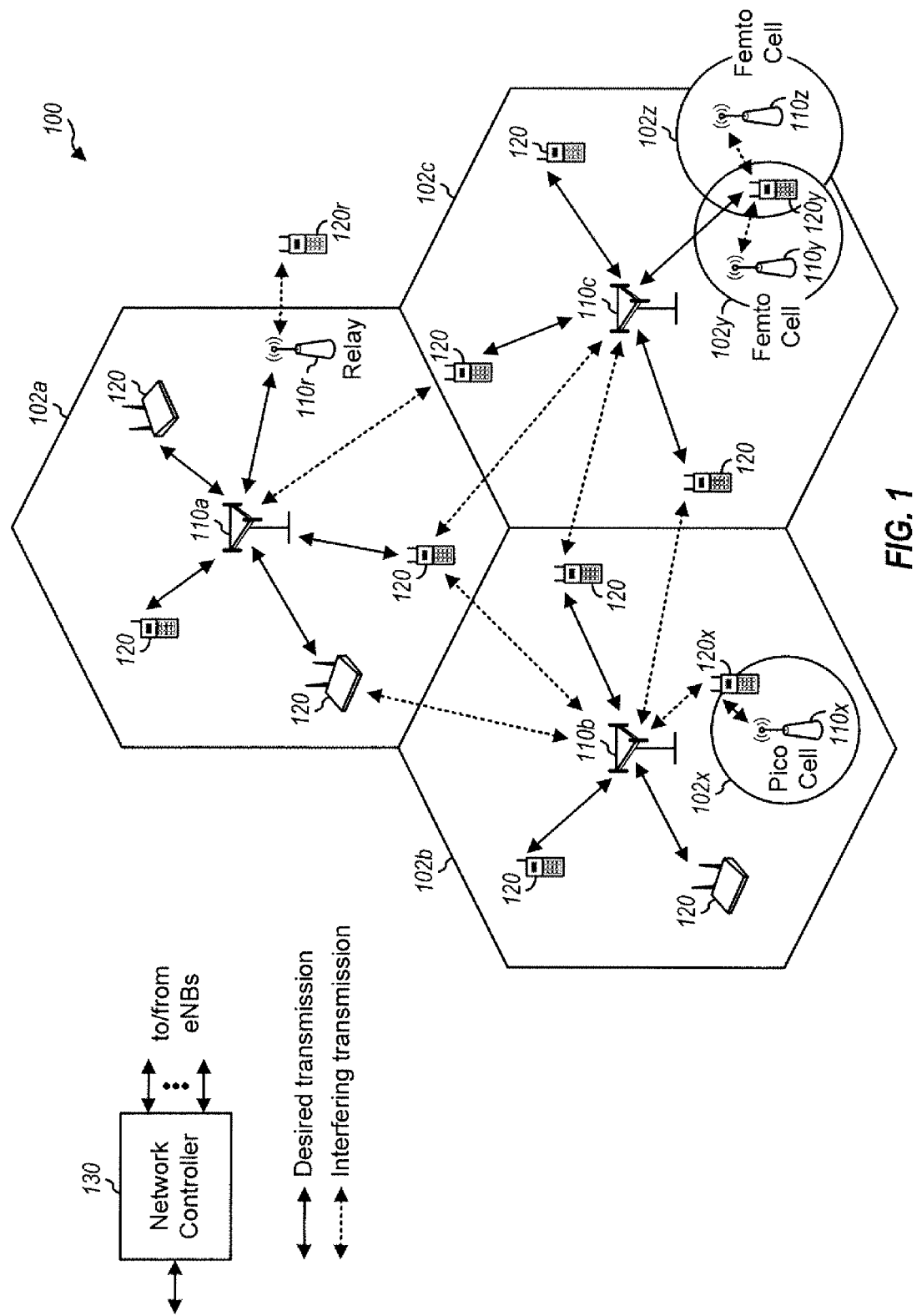
FIG. 1 is a block diagram conceptually illustrating an example of a telecommunications system.

FIG. 1 shows a wireless communication network 100, which may be an LTE-A network, in which channel quality reporting for clean and unclean subframes may be implemented. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 supports a synchronous operation where the eNodeBs have similar frame timing, and transmissions from different eNodeBs may be approximately aligned in time. In one aspect, the wireless network 100 may support frequency division duplex (FDD) modes of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth.

Figure 2:
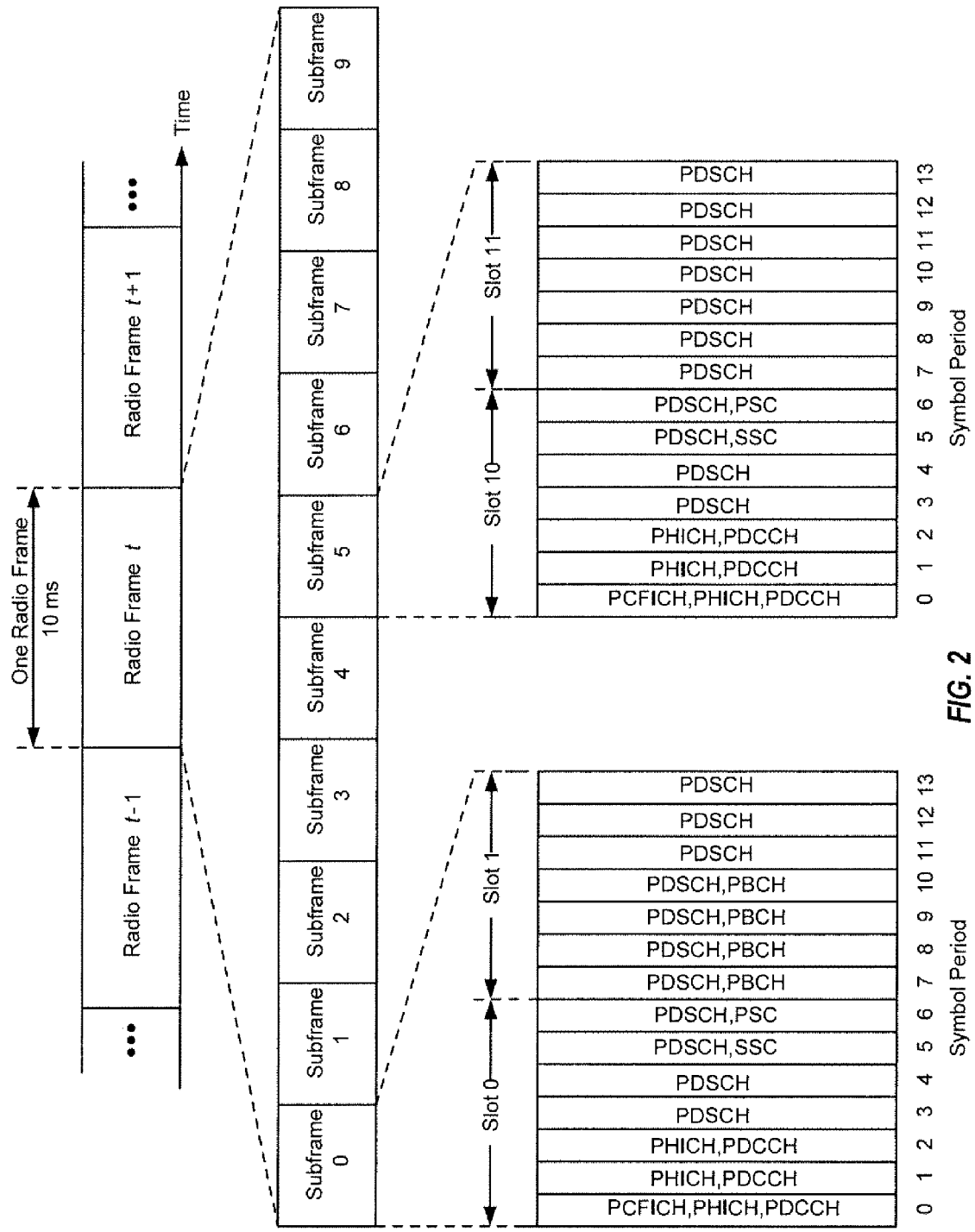
FIG. 2 is a diagram conceptually illustrating an example of a downlink frame structure in a telecommunications system.

FIG. 2 shows a downlink FDD frame structure used in LTE in which channel quality reporting for clean and unclean subframes may be implemented. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
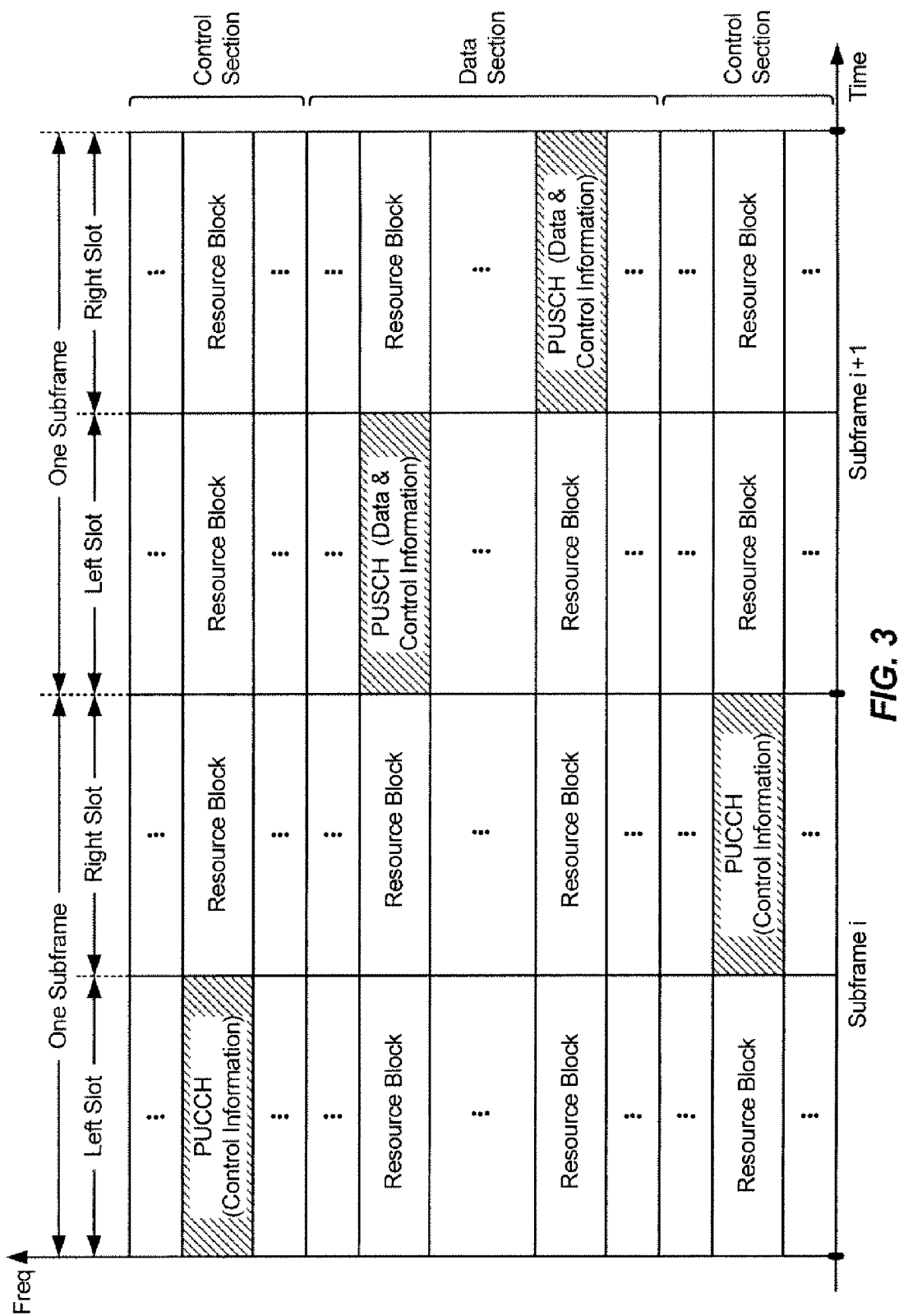
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

Figure 4:
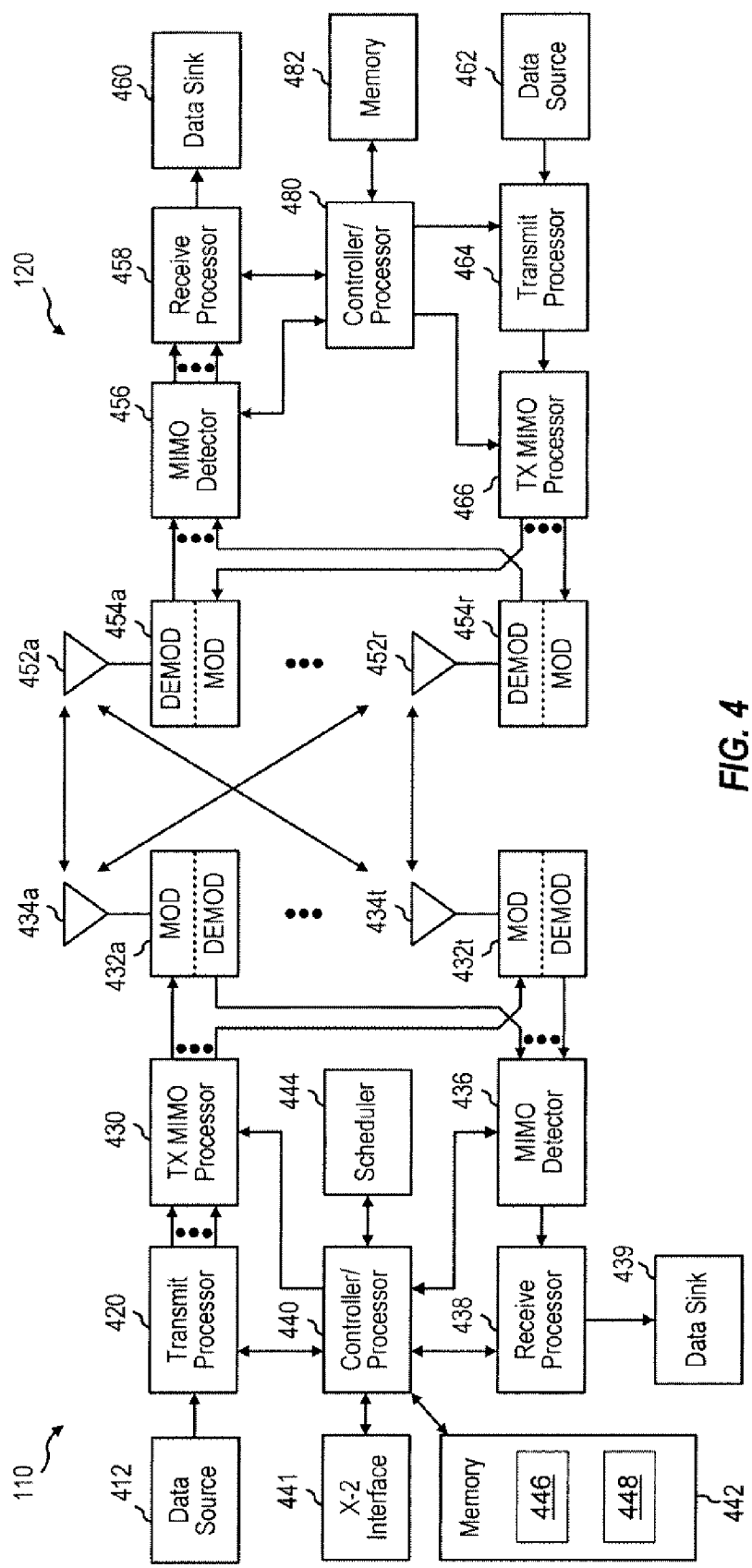
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, in which channel quality reporting for clean and unclean subframes may be implemented.

The eNodeB 110 and UE 120 may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441. Additionally, the memory 442 may include a subframe identification/negotiation module 446. The memory 442 may also include a CQI management module 448.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in use method flow chart FIGS. 7A and 7B, and/or other processes for the techniques described herein. The memories 442 and 482 may store data and program codes for the base station 110 and the UE 120, respectively. A scheduler 444 may schedule UEs for data transmission on the downlink and/or uplink.

A UE may be within the coverage of multiple eNodeBs and one of these eNodeBs may be selected to serve the UE. The serving eNodeB may be selected based on various criteria such as, but not limited to, received power, path loss, signal to noise ratio (SNR), etc. In deployments of heterogeneous networks, such as the wireless network 100, a UE may operate in a dominant interference scenario in which the UE may observe high interference from one or more interfering eNodeBs.

A dominant interference scenario may occur due to restricted association. For example, in FIG. 1, the UE 120y may be close to the femto eNodeB 110y and may have high received power for the eNodeB 110y. However, the UE 120y may not be able to access the femto eNodeB 110y due to restricted association and may then connect to the macro eNodeB 110c (as shown in FIG. 1) or to the femto eNodeB 110z also with lower received power (not shown in FIG. 1). The UE 120y may then observe high interference from the femto eNodeB 110y on the downlink and may also cause high interference to the eNodeB 110y on the uplink. Coordinated interference management may be used to allow the eNodeB 110c and the femto eNodeB 110y to communicate over the backhaul to negotiate resources. In the negotiation, the femto eNodeB 110y agrees to cease transmission on one of its channel resources, such that the UE 120y will not experience as much interference from the femto eNodeB 110y as it communicates with the eNodeB 110c over that same channel.

With range extension enabled in a wireless network, such as the wireless network 100, in order for UEs to obtain service from a lower power base station (i.e., a pico or femto base station) in the presence of a macro base station with stronger downlink signal strength, or for the UEs to obtain service from a macro base station in the presence of a strongly interfering signal from a femto base station to which the UE is not authorized to connect, an enhanced inter-cell interference coordination (eICIC) may be used to coordinate the interfering base station giving up some resources in order to enable control and data transmissions between the UE and the serving base station. When a network supports eICIC, the base stations negotiate with each other to coordinate resources in order to reduce/eliminate interference by the interfering cell giving up part of its resources. With this, a UE can access the serving cell even with severe interference by using the resources yielded by the interfering cell.

A coverage lapse within a macro cell may exist when a femto cell with a closed access mode, in which only member femto UEs may access the cell, lies within the coverage area of the macro cell. By making this femto cell give up some of its resources, the UE within the femto cell coverage area may access its serving macro cell by using the resources yielded by the femto cell. In a radio access system using OFDM such as E-UTRAN, these yielded resources may be time-based, frequency-based, or a combination of both. When the yielded resources are time-based, the interfering cell refrains from using some of its accessible subframes in the time domain. When these resources are frequency-based, the interfering cell does not use some of its accessible subcarriers in the frequency domain. When the yielded resources are a combination of both frequency and time, the interfering cell does not use the resources defined by frequency and time.

Heterogeneous networks may use inter-cell interference coordination (ICIC) to reduce interference from cells in co-channel deployment. One ICIC mechanism is time division multiplexing (TDM) partitioning. In TDM partitioning, subframes are assigned to certain eNodeBs. In subframes assigned to a first eNodeB, neighbor eNodeBs do not transmit. Thus, interference experienced by a UE served by the first eNodeB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNodeB for use exclusively by the first eNodeB. Protected subframes may also be referred to as "clean" subframes based on the lack of interference from neighboring eNodeBs. Prohibited subframes are subframes assigned to a neighbor eNodeB, and the first eNodeB is prohibited from transmitting data during the prohibited subframes. For example, a prohibited subframe of the first eNodeB may correspond to a protected subframe of a second interfering eNodeB. Thus, the first eNodeB is the only eNodeB transmitting data during the first eNodeB's protected subframe. Common subframes may be used for data transmission by multiple eNodeBs. Common subframes may also be referred to as "unclean" subframes because of the possibility of interference from other eNodeBs.

At least one protected subframe is statically assigned per period. In some cases only one protected subframe is statically assigned. For example, if a period is 8 milliseconds, one protected subframe may be statically assigned to an eNodeB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNodeBs of different power classes. For example, three power classes may be defined, in decreasing power class, as macro eNodeBs, pico eNodeBs, and femto eNodeBs. When macro eNodeBs, pico eNodeBs, and femto eNodeBs are in a co-channel deployment, the power spectral density (PSD) of the macro eNodeB (aggressor eNodeB) may be larger than the power spectral density of the pico eNodeB and the femto eNodeB (victim eNodeBs) creating large amounts of interference with the pico eNodeB and the femto eNodeB. Protected subframes may be used to reduce or minimize interference with the pico eNodeBs and femto eNodeBs. That is, a protected subframe may be scheduled for the victim eNodeB to correspond with a prohibited subframe on the aggressor eNodeB.

Figure 5:
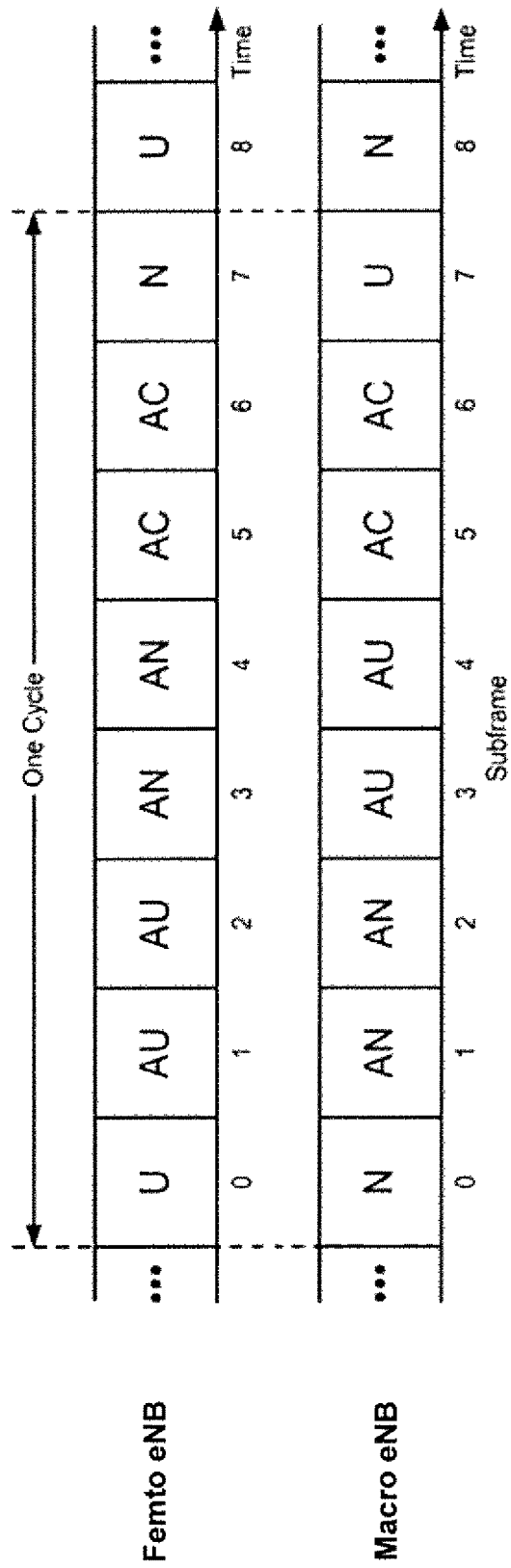
FIG. 5 is a block diagram conceptually illustrating adaptive resource partitioning in a heterogeneous network according to one aspect of the disclosure.

FIG. 5 is a block diagram illustrating TDM partitioning in a heterogeneous network in which channel quality reporting for clean and unclean subframes may be implemented. A first row of blocks illustrate subframe assignments for a femto eNodeB, and a second row of blocks illustrate subframe assignments for a macro eNodeB. Each of the eNodeBs has a static protected subframe during which the other eNodeB has a static prohibited subframe. For example, the femto eNodeB has a protected subframe (U subframe) in subframe 0 corresponding to a prohibited subframe (N subframe) in subframe 0. Likewise, the macro eNodeB has a protected subframe (U subframe) in subframe 7 corresponding to a prohibited subframe (N subframe) in subframe 7. Subframes 1-6 are dynamically (adaptively) assigned as either protected subframes (AU), prohibited subframes (AN), and common subframes (AC). During the dynamically assigned common subframes (AC) in subframes 5 and 6, both the femto eNodeB and the macro eNodeB may transmit data.

Protected subframes (such as U/AU subframes) have reduced interference and a high channel quality because aggressor eNodeBs are prohibited from transmitting. Prohibited subframes (such as N/AN subframes) have no data transmission to allow victim eNodeBs to transmit data with low interference levels. Common subframes (such as C/AC subframes) have a channel quality dependent on the number of neighbor eNodeBs transmitting data. For example, if neighbor eNodeBs are transmitting data on the common subframes, the channel quality of the common subframes may be lower than the protected subframes. Channel quality on common subframes may also be lower for extended boundary area (EBA) UEs strongly affected by aggressor eNodeBs. An EBA UE may belong to a first eNodeB but also be located in the coverage area of a second eNodeB. For example, a UE communicating with a macro eNodeB that is near the range limit of a femto eNodeB coverage is an EBA UE.

In order to properly implement and maintain eICIC an eNodeB regularly monitors the interference experienced in different subframe types by the various UEs it serves. That is, the eNodeB distinguishes interference on clean subframes, unclean subframe, common subframes, etc. However, legacy UEs can only monitor CQI generally, and cannot distinguish between different sets of subframes. Furthermore, more conventional UEs can only monitor two subframe types.

The channel quality indicator (CQI) may be different for different subframe types. For example, the CQI of a protected subframe may be much higher than the CQI of a common subframe. Typically, when scheduling subframes, an eNodeB knows the correct CQI for each subframe considered for scheduling. For example, if an eNodeB is scheduling a common subframe, the eNodeB does not use the CQI for a protected subframe, because the CQI of the protected subframe is too optimistic. Although the following description is with respect to CQI, it is noted that any type of channel quality estimates are contemplated to be within the scope of the present disclosure.

New UEs may be adapted to measure CQI of multiple subframe types. One aspect of the present disclosure implements CQI reporting in both legacy UEs and newer UEs such that UEs may report CQI for subframes with different interference levels using a single CQI subframe measurement assignment.

An eNodeB can broadcast common reference signals (CRS) for use by UEs to acquire the eNodeB, perform downlink CQI measurements, and perform downlink channel estimation. Newer UEs typically have a reference signal-interference cancellation (RS-IC) capability allowing a newer UE to identify overlapping CRSs. However, to enable legacy UEs to function in a cell, eNodeBs may be designed to prevent overlapping CRS. For example, when multiple different power class eNodeBs are present in a cell, the CRS is offset such that the CRS of different eNodeBs does not collide. In particular, in LTE, there are three available CRS offsets (assuming two transmission antenna at the eNodeB) and each eNodeB is assigned a different CRS offset. Alternately, assuming one transmission antenna at the eNodeB, there are six different CRS offsets.

When the UE performs CQI measurements during the clean frames, the CQI measurements tend to be higher because the aggressor eNodeBs are silent. However, a CQI measurement performed by the UE on an unclean subframe may be lower than that of a clean subframe. For example, if the aggressor eNodeB is transmitting during the unclean subframe, the CQI of the common subframe may be low. However, if the aggressor eNodeB is not transmitting during the unclean subframe, the CQI may be high. The CQI may be correlated to the downlink buffer of the aggressor eNodeB. For example, if the downlink buffer of the aggressor eNodeB is full, the CQI may be low, but if the downlink buffer of the aggressor eNodeB is empty, the CQI may be high.

The subframe assignments may be correlated to interference patterns in cells because the subframe assignments are used to coordinate interference between eNodeBs in a cell. Subframe assignments, and thus, interference patterns, in cells repeat periodically. For example, in some cells the interference pattern repeats every eight milliseconds.

Additionally, providing a reporting periodicity that is a multiple of the periodicity of assignments in a cell would result in only a single subframe type (clean or unclean) being measured and reported through CQI measurements to the eNodeB. Whether a clean or unclean subframe is measured by the UE's CQI measurement in this case depends on the subframe offset indicated to the UE through a radio resource configuration (RRC) message.

In one aspect, a UE may be directed to provide CQI measurements at a periodic interval that is not a multiple of the periodicity of interference patterns in the cell. For example, in the case the interference pattern periodicity is 8 milliseconds, the CQI measurements may occur periodically at any interval other than 8 milliseconds. For example, the CQI measurement periodicity may be selected as 10 milliseconds.

Figure 6:
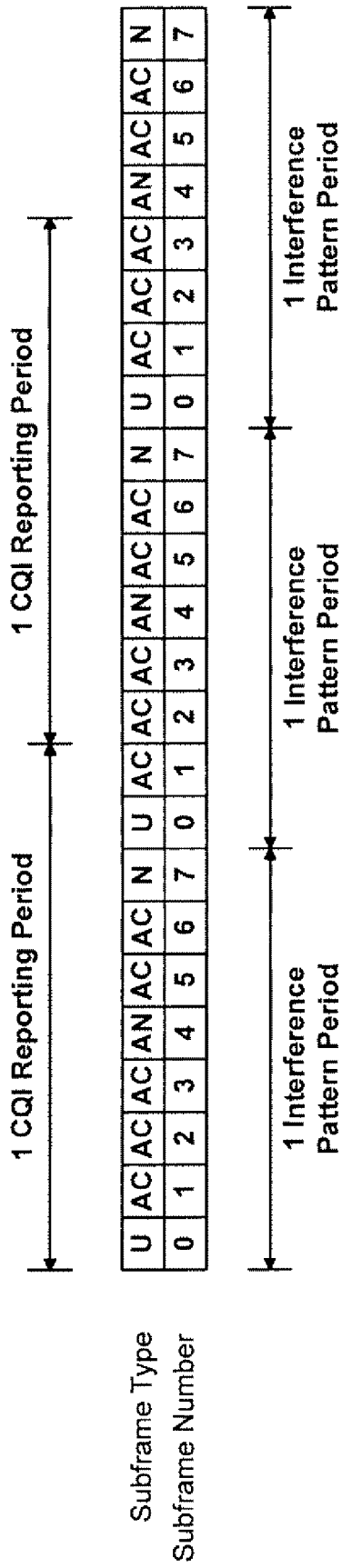
FIG. 6 is a block diagram illustrating the channel quality indicator (CQI) reporting period according to one aspect of the present disclosure.

FIG. 6 is a block diagram illustrating the CQI reporting period according to one aspect of the disclosure. Each interference pattern period is illustrated as eight subframes. Thus, the subframe type assignment repeats each eight subframes. Each CQI reporting period is illustrated as 10 subframes. Thus, a UE performs CQI measurement and reporting at subframe 0 of the first interference pattern period, subframe 2 of the second interference pattern period, and subframe 4 of the third interference pattern period. In this example, the respective subframe types for the CQI measurements and reporting are a protected subframe (U subframe), common subframe (AC subframe), and prohibited subframe (N subframe).

Figure 7C:
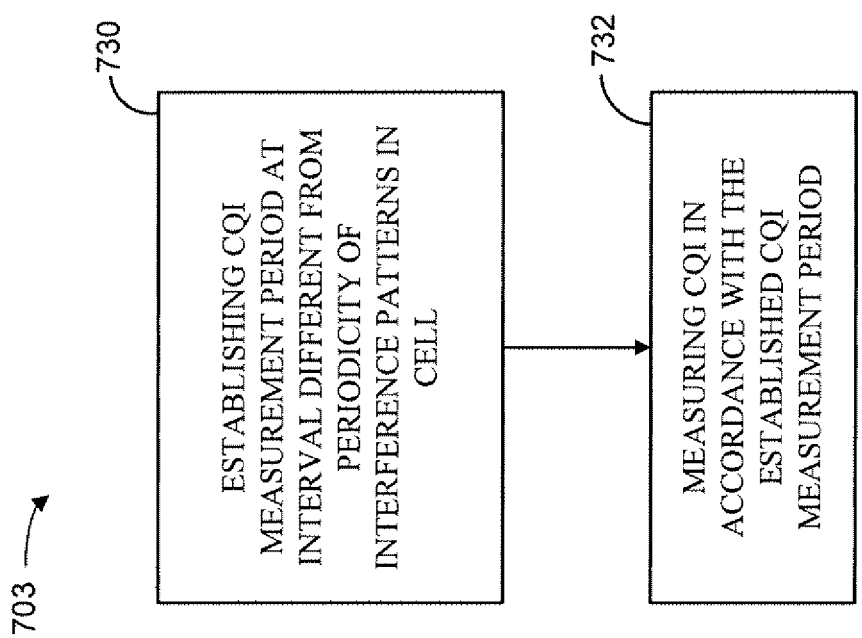

In one aspect, a method 703 for measuring CQI is illustrated in FIG. 7C. At block 730, a UE is directed to establish a CQI measurement period at intervals that are not a multiple of the periodicity of interference patterns in the cell. At block 732, CQI is measured and reported in accordance with the established CQI measurement period.

The measurement period can be based on a prime number, such as five. If the interference period is eight, a measurement period of five ensures that each type of subframe (e.g., clean and unclean) is visited within 40 ms. A forty millisecond periodicity of CQI reports may be insufficient to provide the eNodeB with up-to-date information in some situations such as, for example, when subframes are dynamically assigned or UEs are moving at high speeds.

When the CQI reporting periodicity is selected to have a different length than the interference pattern periodicity, the UE may visit different interlaces. As long as the different interlaces include both clean and unclean subframes, the UE performs CQI measurements on both clean and unclean subframes.

After the UE reports the CQI measurements to a serving eNodeB, the eNodeB scheduler has up-to-date information regarding both clean and unclean subframes. Because the eNodeB knows the subframe assignments, the eNodeB may determine the subframe type assigned to each CQI measurement without the UE knowing the subframe type being measured. According to one aspect, the eNodeB maintains two CQI backoff loops for tracking CQI measurements. Based on the subframe assignment, the eNodeB can feed the incoming CQI reports to one of the multiple CQI backoff loops. For example, the eNode B may manage two CQI backoff loops corresponding to a clean CQI subframe loop and an unclean CQI subframe loop. If the periodicity selected for CQI measurements does not obtain measurements of clean and unclean subframes, the eNodeB may instruct the UE to select a new periodicity or offset through RRC messages.

According to another aspect, CQI reporting may be performed for individual frequency subbands when frequency division multiplexing (FDM) is occurring. The UEs, including legacy UEs, may be instructed by an eNodeB to perform frequency domain CQI reporting. In frequency domain CQI reporting, the UE reports a CQI measurement of a subframe for a particular frequency subband. The eNodeB may instruct the UE on the number of frequency subbands and which frequency subbands on which to perform CQI measurements through radio resource control (RRC) messaging. Frequency selection of CQI measurements in different subbands allows the eNodeB to use a schedule that takes into consideration information regarding the subbands.

In one aspect, the aggressor eNodeB determines a particular subframe in which the UE served by a victim base station will perform a CQI measurement. The determination may be based upon a transmission from the second base station that specifically identifies the subframe for CQI measurement. Optionally, the aggressor and victim base stations may negotiate over a backhaul to identify the particular subframe for CQI measurement. Further, a predetermined rule may identify the particular subframe.

Figure 8A:
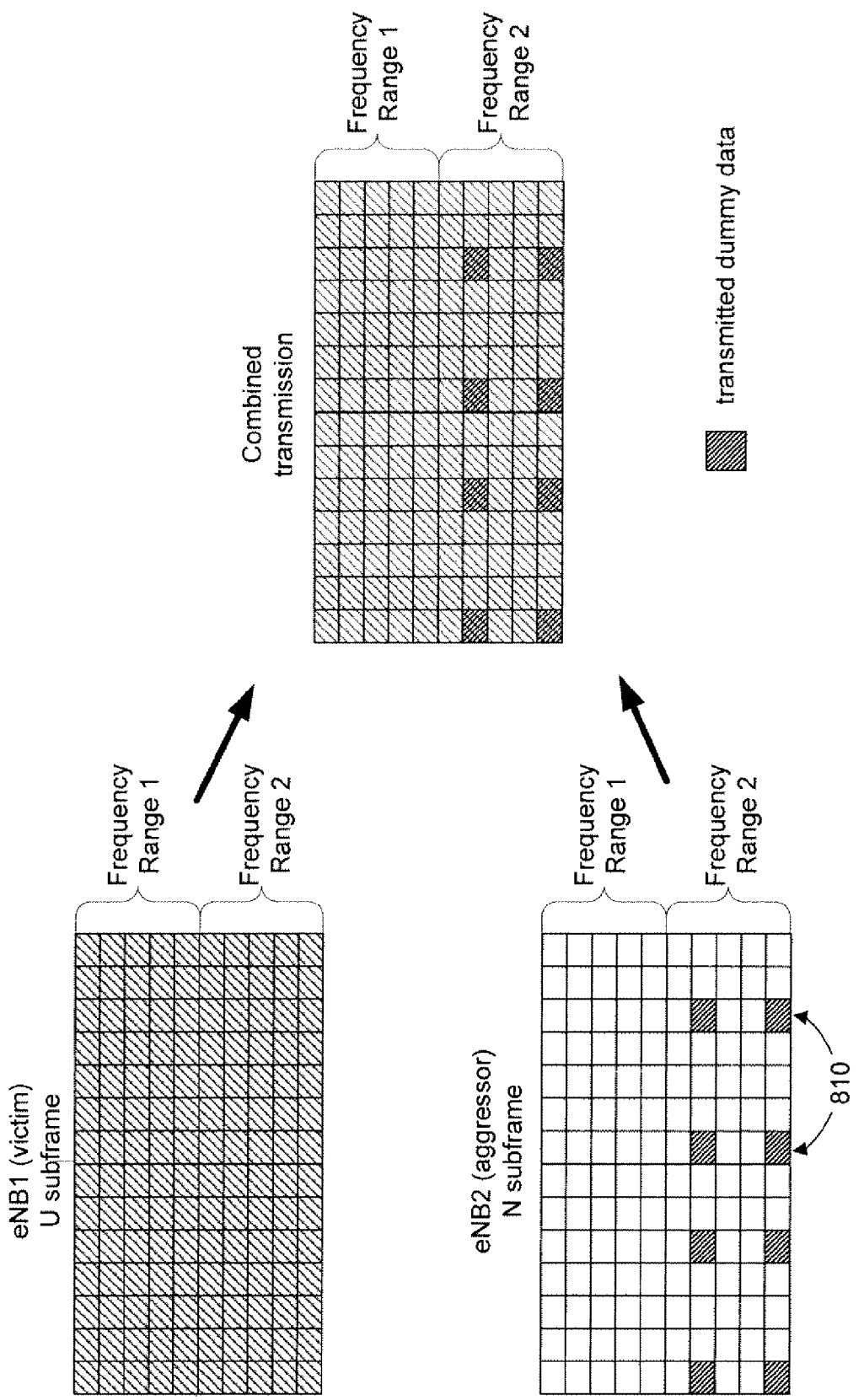
FIG. 8A is a block diagram conceptually illustrating transmitting dummy data to simulated unclean subframes.

When a CQI measurement is performed on a clean subframe, all of the subbands may have a high CQI. A CQI for an unclean subframe may be measured by using an eNodeB to simulate unclean subframes. For example, referring to FIG. 8A, an aggressor eNodeB may transmit dummy data on resource elements (REs) 810 used by a victim eNodeB's CRS on a specific subband. The transmitted dummy data generates interference on the frequency subband. According to one aspect, the dummy data are pseudo-random signals (i.e., noise) not directed to any specific UE. If the transmission power spectral density (TX PSD) of the dummy data is the same as (or similar to) the TX PSD of data during real data transmission, then the CQI measured by a UE on the subband is approximately equal to the CQI of an unclean subframe when the aggressor eNodeB has full downlink buffers.

The measured CQI of the unclean subframe on the subband may be lower than the measured CQI of a clean subframe. The number of resource elements jammed by an aggressor eNodeB may be a function of the amount of data in the downlink buffer of the aggressor eNodeB. An aggressor eNodeB may mimic a partially loaded system, by transmitting interfering dummy data on only some resource elements. For example, if the eNodeB knows the system is only 50% loaded, then the eNodeB would only pollute 50% of the resource elements. In another configuration, the eNodeB examines a history of loading to estimate the current load.

According to another aspect, a frequency subband may be set aside as a special frequency subband. For example, the special frequency subband may be a reserved frequency subband where resource elements used by a victim eNodeB's CRS are not used for data transmission by the aggressor eNodeB.

Figure 8B:
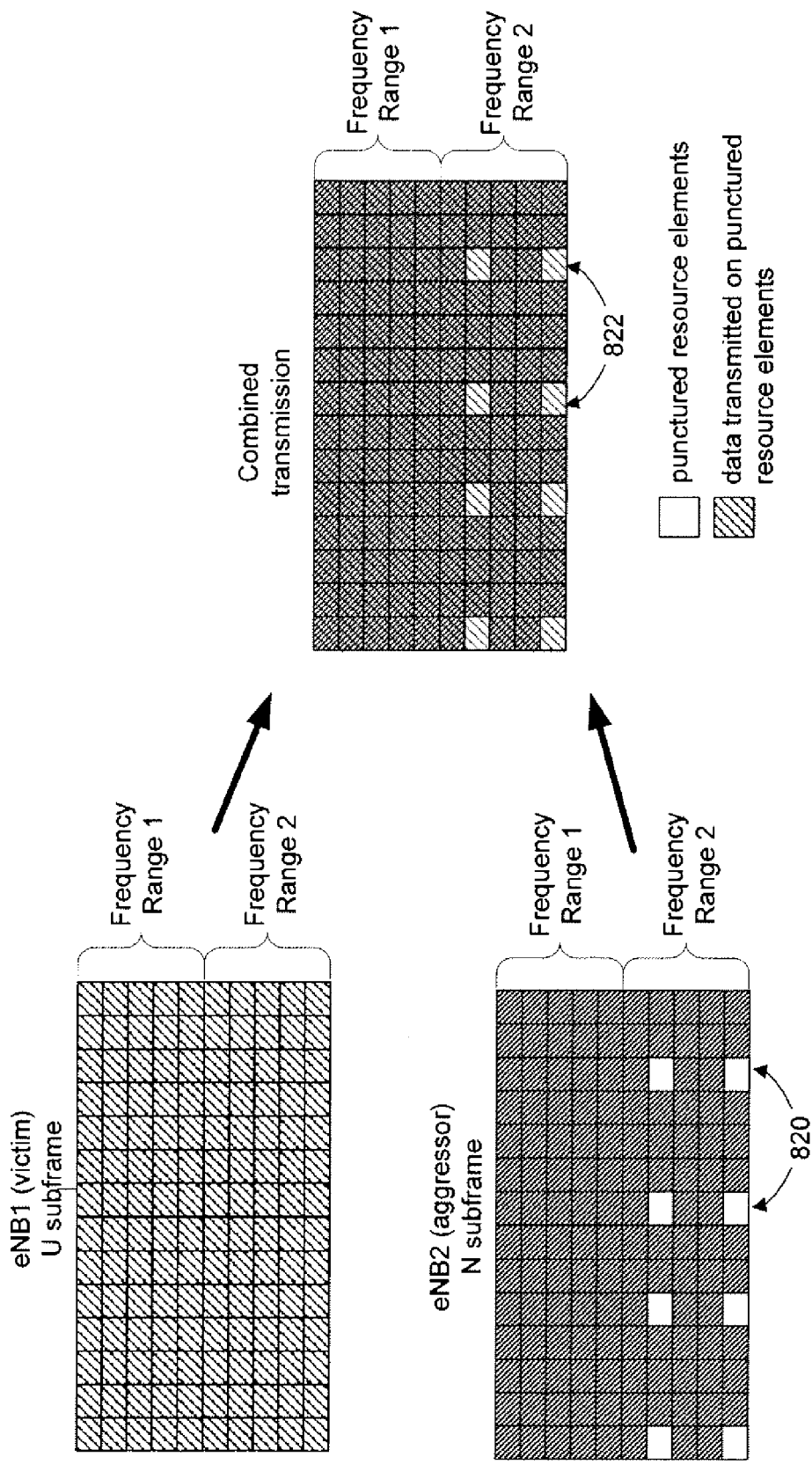
FIG. 8B is a block diagram conceptually illustrating puncturing subbands to simulate.

Alternatively, the special frequency subband may be used for data transmission but the symbols in the reserved resource elements are punctured. For example, referring to FIG. 8B, data transmission may take place on the frequency subbands as long as no symbols are transmitted on resource elements belonging to the CRS of a victim eNodeB. The resource elements 820 of the aggressor eNodeB are punctured to allow for transmission of resource elements 822 reserved for the victim eNodeB. The CQI measurements on the reserved frequency subband are comparable to clean subframe measurements because of the absence of interference on the CRS resource elements. Additionally, a partially loaded system may be simulated by puncturing some of the CRS tones.

The special frequency subband may be, for example, statically assigned, negotiated between eNodeBs, or follow a hopping pattern according to a pseudo-random (but deterministically known) pattern. According to one aspect, the special frequency subband is a hopping subband designed such that CQI reports of both clean and unclean subframes are periodically received by the eNodeB for all frequency subbands.

When CQI reporting is performed on frequency subbands, the eNodeB may receive CQI reports for both clean and unclean subframes in the same report. For example, the CQI report may include information for a clean subframe on a first frequency subband and an unclean subframe on a second frequency subband. In one aspect, the clean and unclean subbands alternate in the time domain. When scheduling subframes, an eNodeB may use CQI reports from clean subframes across the entire bandwidth (all frequency subbands) and unclean subframes across the entire bandwidth.

According to one aspect, when deriving the CQI reports, the eNodeB may estimate, through blind detection, which frequency subband was cleaned and/or which frequency subband was jammed, in case this information is not available. Alternatively, this information is negotiated between the eNodeBs.

The methods described above for performing CQI measurements of clean and unclean subframes allow both legacy UEs and newer UEs to provide CQI reports to the eNodeB for multiple types of subframes. Moreover, no additional information is transferred to the UE for making the CQI measurements beyond the information normally provided to the UE through radio resource control signaling. That is, no new periodicities and no indication of which subframe to use for clean subframe and unclean subframe CQI measurements is provided to the UE. Moreover, no new methods for jointly reporting different types of subframes are added to the UE.

FIG. 7A illustrates a method 701 for estimating channel quality by a first base station, the aggressor base station, in a wireless network. In block 710, the first base station determines a subframe in which a UE served by a second base station, the victim base station, will perform a channel measurement. In block 712, the first base station affects the channel measurement by either (1) transmitting dummy signals over CRS tones corresponding to the second base station on a first selected subband during the subframe or (2) puncturing transmission during the CRS tones corresponding to the second base station over a second selected subband during the subframe (e.g., over the backhaul or using a wireless interface).

FIG. 7B illustrates a method 702 for channel quality estimation in a wireless network. In block 720, a victim base station indicates to a user equipment (UE) to perform channel quality measurements for at least two subbands in a subframe.

The base station receives a first channel quality report and a second channel quality report from a UE in block 722. The first channel quality report includes a first channel measurement of a first subband and the second channel quality report includes a second channel measurement of a second subband. In block 724, the base station determines separate channel measurements for clean and unclean subframes based on the first and second reports.

This description may apply to ARPI and may also apply to semi-static assignments without dynamic subframe assignment. Although the preceding description was with respect to clean and unclean subframes, other types of subframes are also contemplated, e.g., dynamic clean, dynamic unclean, special, etc.

In one configuration, an aggressor eNodeB 110 is configured for wireless communication including means for determining. In one aspect, the determining means may be the controller/processor 440 and memory 442 configured to perform the functions recited by the determining means. The eNodeB 110 is also configured to include a means for affecting the channel quality measurement. In one aspect, the affecting means may be the controller/processor 440, memory 442, transmit processor 420, modulators 432a-t and antenna 434a-t configured to perform the functions recited by the affecting means. In another aspect, the aforementioned means may be a module or any apparatus configured to perform the functions recited by the aforementioned means.

In one configuration, a victim eNodeB 110 is configured for wireless communication including means for indicating. In one aspect, the indicating means may be the controller processor 440, memory 442, transmit processor 420, modulators 432a-t and antenna 434a-t configured to perform the functions recited by the indicating means. The eNodeB 110 is also configured to include a means for receiving. In one aspect, the receiving means may be the receive processor 438, demodulators 432a-t, controller/processor 440 and antenna 434a-t configured to perform the functions recited by the receiving means. The eNodeB 110 is also configured to include a means for determining. In one aspect, the determining means may be the controller/processor 440 and memory 442 configured to perform the functions recited by the determining means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for channel quality estimation by a first base station in a wireless network, comprising:
   determining a subframe in which a user equipment (UE) served by a second base station will perform a channel quality measurement; and
   affecting the channel quality measurement by at least one of:
      transmitting dummy signals over designated tones corresponding to the second base station on a first selected subband during the subframe; and
      puncturing transmissions during designated tones corresponding to the second base station over a second selected subband during the subframe.

2. The method of claim 1, in which the determining comprises at least one of:
   negotiating over a backhaul between the first and second base stations to identify the subframe; and
   identifying the subframe by a predetermined rule.

3. The method of claim 1, in which the designated tones comprise common reference signals (CRS).

4. The method of claim 3, in which transmitting dummy signals comprises transmitting dummy signals on a first portion of CRS tones in the first subband to simulate a partially loaded system, the first portion depending on a load of the first base station.

5. The method of claim 3, in which puncturing transmissions comprises puncturing a second portion of the CRS tones in the second subband to simulate a partially loaded system, the second portion depending on a load of the first base station.

6. The method of claim 1, in which the first and second subbands are at least one of:
   statically assigned, semi-statically negotiated among involved base stations, and
   dynamically changing following predefined hopping patterns.

7. The method of claim 1, further comprising combining consecutive channel quality reports corresponding to a same type of subframe and different subbands; and
   obtaining a wideband report via statistical analysis of the consecutive channel quality reports.

8. An apparatus for wireless communication, comprising:
   means for determining a subframe in which a user equipment (UE) served by a second base station will perform a channel quality measurement; and
   means for affecting the channel quality measurement by at least one of:
      transmitting dummy signals over designated tones corresponding to the second base station on a first selected subband during the subframe; and
      puncturing transmissions during designated tones corresponding to the second base station over a second selected subband during the subframe.

9. A computer program product for wireless communication in a wireless network, comprising:
   a non-transitory computer-readable medium having non-transitory program code recorded thereon, the program code comprising:
      program code to determine a subframe in which a user equipment (UE) served by a second base station will perform a channel quality measurement; and
      program code to affect the channel quality measurement by at least one of:
         transmitting dummy signals over designated tones corresponding to the second base station on a first selected subband during the subframe; and
         puncturing transmissions during designated tones corresponding to the second base station over a second selected subband during the subframe.

10. An apparatus for wireless communication, comprising:
    a memory; and
    at least one processor coupled to the memory, the at least one processor being configured:
       to determine a subframe in which a user equipment (UE) served by a second base station will perform a channel quality measurement; and
       to affect the channel quality measurement by at least one of:
          transmitting dummy signals over designated tones corresponding to the second base station on a first selected subband during the subframe; and
          puncturing transmissions during designated tones corresponding to the second base station over a second selected subband during the subframe.

11. The apparatus of claim 10, in which the processor is configured to determine a subframe by at least one of:
    negotiating over a backhaul between the first and second base stations to identify the subframe; and
    identifying the subframe by a predetermined rule.

12. The apparatus of claim 10, in which the designated tones comprise common reference signals (CRS).

13. The apparatus of claim 12, in which the processor is further configured to affect the channel quality measurement by transmitting dummy signals to a first portion of CRS tones in the first subband to simulate a partially loaded system, the first portion depending on a load of the first base station.

14. The apparatus of claim 12, in which the processor is further configured to affect the channel quality measurement by puncturing a second portion of the CRS tones in the second subband to simulate a partially loaded system, the second portion depending on a load of the first base station.

15. The apparatus of claim 10, in which the first and second subbands are at least one of:
    statically assigned, semi-statically negotiated among involved base stations, and
    dynamically changing following predefined hopping patterns.

16. The apparatus of claim 10, in which the processor is further configured:
    to combine consecutive channel quality reports corresponding to a same type of subframe and different subbands; and
    to obtain a wideband report via statistical analysis based on the consecutive channel quality reports.

17. A method for channel quality estimation by a first base station in a wireless network, comprising:
    determining a subframe in which a user equipment (UE) will perform a channel quality measurement; and
    affecting the channel quality measurement at the UE by puncturing transmissions during designated tones corresponding to a second base station over selected resources during the subframe.

18. The method of claim 17, in which the designated tones are reference signals transmitted by the second base station.

19. The method of claim 18, in which the reference signals comprise channel state information reference signals (CSI-RS) transmitted by the second base station.

20. The method of claim 17, in which the determining comprises at least one of:
    negotiating over a backhaul between the first and second base stations to identify the subframe; and
    identifying the subframe by a predetermined rule.

21. The method of claim 17, in which puncturing transmissions comprises simulating a partially loaded system based on a load at the first base station.

22. An apparatus for wireless communication, comprising:
a memory; and
at least one processor coupled to the memory, the at least one processor being configured to:
determine a subframe in which a user equipment (UE) will perform a channel quality measurement; and
affect the channel quality measurement at the UE by puncturing transmissions during designated tones corresponding to a second base station over selected resources during the subframe.

23. The apparatus of claim 22, in which the designated tones are reference signals transmitted by the second base station.

24. The method of claim 23, in which the reference signals comprise channel state information reference signals (CSI-RS) transmitted by the second base station.

25. The apparatus of claim 22, in which the determining comprises at least one of:
negotiating over a backhaul between the first and second base stations to identify the subframe; and
identifying the subframe by a predetermined rule.

26. The apparatus of claim 22, in which puncturing transmissions comprises simulating a partially loaded system based on a load at the first base station.

27. An apparatus for wireless communication, comprising:
means for determining a subframe in which a user equipment (UE) will perform a channel quality measurement; and
means for affecting the channel quality measurement at the UE by puncturing transmissions during designated tones corresponding to a second base station over selected-resources during the subframe.

28. A computer program stored on a non-transitory computer readable medium, comprising code for:
determining a subframe in which a user equipment (UE) will perform a channel quality measurement; and
affecting the channel quality measurement at the UE by puncturing transmissions during designated tones corresponding to a second base station over selected resources during the subframe.

* * * * *